(12) United States Patent
Lim (10) Patent No.: US 7,107,076 B2
(45) Date of Patent: Sep. 12, 2006

(54) METHOD FOR ACCESSING TELEPHONE NUMBER IN MOBILE COMMUNICATION TERMINAL

(75) Inventor: Young Bherm Lim, Kyungki-Do (KR)

(73) Assignee: LG Electronics Inc., Seoul (KR)

(*) Notice: Subject to any disclaimer, the term of this patent is extended or adjusted under 35 U.S.C. 154(b) by 376 days.

(21) Appl. No.: 10/140,812

(22) Filed: May 9, 2002

(65) Prior Publication Data

US 2002/0169007 A1    Nov. 14, 2002

(30) Foreign Application Priority Data

May 12, 2001   (KR) ............................... 2001-25996

(51) Int. Cl.
H04B 1/38       (2006.01)
H04M 1/00       (2006.01)
(52) U.S. Cl. ................... 455/564; 455/566; 379/354
(58) Field of Classification Search ............ 455/550.1, 455/564, 566; 379/354, 356.01, 100.14
See application file for complete search history.

(56) References Cited

U.S. PATENT DOCUMENTS

| | | | |
|---|---|---|---|
| 5,305,372 A * | 4/1994 | Tomiyori ................ 455/564 |
| 5,515,497 A | 5/1996 | Itri et al. ................ 395/159 |
| 5,535,258 A * | 7/1996 | Joglekar et al. ............ 455/564 |
| 5,604,492 A | 2/1997 | Abdul-Halim ......... 340/825.44 |
| 5,768,362 A * | 6/1998 | Moon .................... 379/355.05 |
| 6,185,295 B1 * | 2/2001 | Frederiksen et al. ... 379/355.05 |
| 6,222,921 B1 | 4/2001 | Mugura et al. ............ 379/354 |
| 6,370,519 B1 * | 4/2002 | Kim ............................ 707/1 |
| 6,430,405 B1 * | 8/2002 | Jambhekar et al. ......... 455/403 |
| 6,556,846 B1 * | 4/2003 | Kimura .................... 455/563 |

FOREIGN PATENT DOCUMENTS

| | | |
|---|---|---|
| EP | 0 982 913 A2 | 1/2000 |
| JP | 403184453 A * | 8/1991 |
| JP | 404096460 A * | 3/1992 |
| JP | 10-042028 | 2/1998 |
| JP | 411215224 A * | 8/1999 |

OTHER PUBLICATIONS

Japanese Office Action dated Nov. 11, 2004.

* cited by examiner

Primary Examiner—Nguyen T. Vo
(74) Attorney, Agent, or Firm—Fleshner & Kim, LLP.

(57) ABSTRACT

A method for accessing a telephone number in a mobile communication terminal, which assigns a series of numbers to detailed items of a storing address corresponding to a hot key inputted by a user of a mobile terminal provides accesses to a telephone number in a detailed item using the hot key. A call to the telephone number in the detailed item can be made using the hot key by inputting a key representing the detailed item with an identification key and a call can be made to the corresponding number, or the detailed item can be displayed on a display unit, whereby the user can make a call conveniently.

20 Claims, 5 Drawing Sheets

```
[032] KIL-DONG,HONG
      HOME   : 02-783-1234
      OFFICE : 02-2260-4567
      CELLULAR PHONE : 019-789-1234
[033] KIL-SUN,HONG
      HOME   : 031-234-5678
      OFFICE : 031-854-1234
      CELLULAR PHONE : 019-741-5678
```

```
[032] KIL-DONG,HONG
        HOME    : 02-783-1234
        OFFICE  : 02-2260-4567
      * CELLULAR PHONE : 019-789-1234
[033] KIL-SUN,HONG
      * HOME    : 031-234-5678
        OFFICE  : 031-854-1234
        CELLULAR PHONE : 019-741-5678
```

METHOD FOR ACCESSING TELEPHONE NUMBER IN MOBILE COMMUNICATION TERMINAL

BACKGROUND OF THE INVENTION

1. Field of the Invention

The present invention relates to a method for accessing a telephone number in a mobile communication terminal, and more particularly to a method for accessing a telephone number in a mobile terminal using a hot key inputted by a user of the mobile terminal.

2. Background of the Related Art

A user of a mobile communication terminal generally assigns a telephone number storing area (memory location) in a memory of a mobile terminal. The user can store respective telephone numbers and related information in the various memory locations. When the user wants to call the telephone number stored in the memory locations, the user can attempt to connect the call using a hot key corresponding to the memory locations in which the telephone number is stored. If the user does not remember the hot key for the memory locations of the corresponding telephone number, the user can search a telephone number searching menu for the telephone number corresponding to the data stored in the telephone number storing area. The search can be done using any of the storing address, the telephone number, and the associated name that were inputted when the telephone number was stored. The user can then try to call connect to the searched telephone number.

In the above described related art telephone number accessing method, the user optionally stores a home number, an office number, and a cellular phone number related to a particular person in respective memory locations. It can therefore be inconvenient to manage telephone numbers for the same person. In addition, it may be difficult to remember all corresponding storing addresses. The function of accessing the telephone number using the storing address is thus lowered.

In order to solve the above problem, when a certain storing address is set, each of the telephone numbers for the particular person are stored in detailed items under a single memory locations. One of the detailed items is set as a representative or default telephone number. For example, in order to connect the storing address comprising detailed items such as house, office, and cell phone to the hot key, one of the telephone numbers stored in the detailed items is set as a representative number associated with the hot key.

Figure 1:
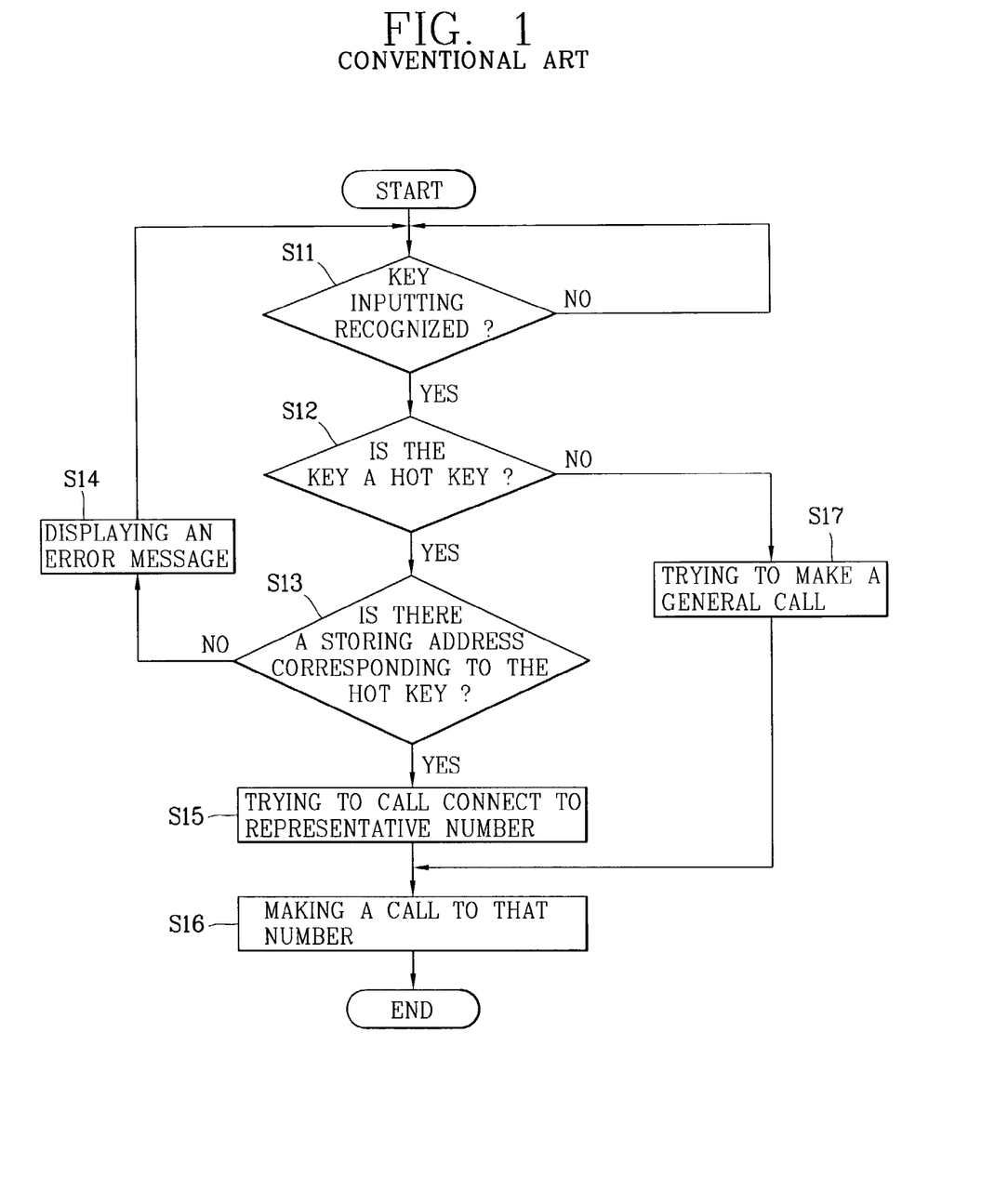
FIG. 1 is a flow chart showing a related art operation for accessing a telephone number.

FIG. 1 is a flow chart showing a related art method for accessing a telephone number in the mobile terminal. As shown therein, the mobile terminal determines whether or not the user inputs a key and recognizes key data generated when the user selects or depresses a key in an idle mode (S11). Next, if a key has been depressed, it is determined whether or not the inputted key is a hot key (S12). If no key input has been detected, however, the process returns to step S11 to determine whether or not the user inputs the key. The mobile terminal discerns that the depressed key is the hot key when the depressed key generates a signal after being pushed for a prescribed period of time. Alternatively, the mobile terminal determines the key pushing to be a general telephone number when the key is not pushed more than a reference time.

When the key inputted by the user is the hot key, the mobile terminal determines whether there is a memory location corresponding to the inputted key (S13). If there is no corresponding memory locations the mobile terminal displays an error message on a display unit (S14) and returns to step S11. However, if there is the storing address corresponding to the inputted key, a call connection to the telephone number which is set as the representative number among the detailed items in the storing address is attempted (S15). When the call is connected (S16), the mobile terminal returns to the process of recognizing the key input of the user after the call is completed.

If the inputted key is not the hot key, the mobile terminal defines the inputted key as a general telephone number and attempts to call that telephone number (S17). If the inputted key comprises an appropriate telephone number structure, the call is made.

Figure 2:
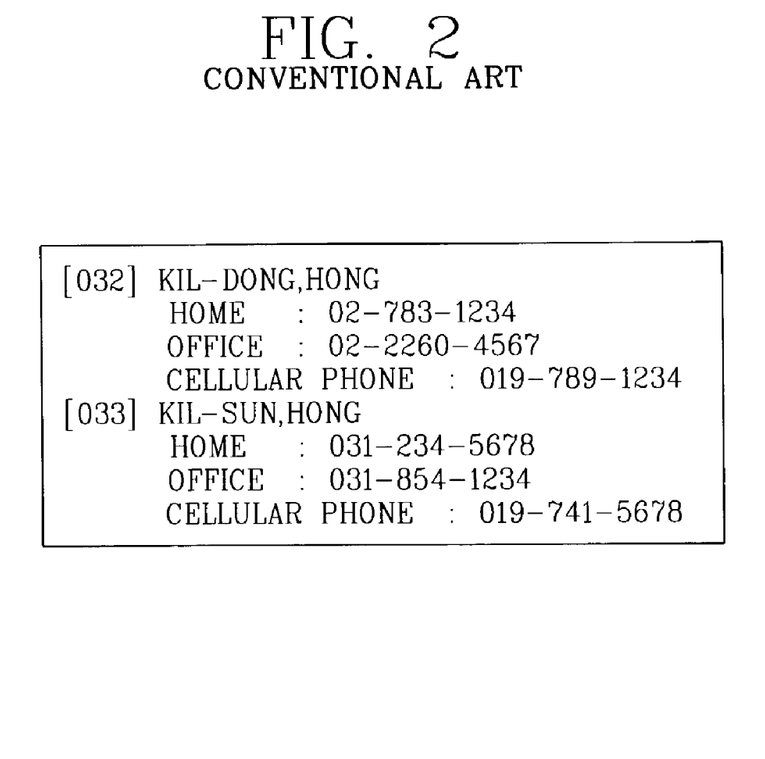
FIG. 2 is a drawing showing a telephone number stored according to the related art.

As shown in FIG. 2, the user who stores the telephone number as group unit inputs the storing number 032 corresponding to Kil-dong, Hong through a key input unit of the mobile terminal in order to make a call to a cell phone of Kil-dong, Hong.

When the inputted key 032 is determined to be the hot key, the mobile terminal searches the memory locations corresponding to 032. Additionally, the mobile phone displays the cell phone number 019-789-1234, which is the representative number of Kil-dong, Hong, on the display unit of the mobile terminal and attempts to call the cell phone number.

The related art method of accessing a telephone number in the mobile phone using the hot key has various problems. For example, the call is only connected to the representative number of the corresponding memory locations. Therefore, if the user wants to make a call to a telephone number other that the representative number, the user is not able to use the hot key. Instead, the user is required to search for the telephone number using the searching function in the user menu or must manually input the telephone number to call that telephone number.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for accessing a telephone number in a mobile communication terminal which is able to access to a telephone number in a detailed item using a hot key by providing a detailed item telephone number in a storing address corresponding to a hot key inputted by a user of a mobile terminal.

To achieve the above objects in whole or in parts, there is provided a method for accessing to a telephone number in a mobile communication terminal, including a step of judging whether or not key data transmitted by a key inputting of a user is a storing address; a step of judging whether there is a detailed item in the storing address of the key data; and a step of displaying the corresponding detailed item on a display unit and calling the corresponding telephone number.

Preferably, the detailed items including a series of telephone numbers are formed at sub-position of the storing address. Additionally, the step of judging the storing address preferably includes a step of judging whether or not the user pushes a key input unit in an idle mode of the mobile terminal; and a step of judging whether or not the storing address is included in the key data generated by the user.

Preferably, the step of judging detailed item includes a step of performing corresponding mode if the inputted key is not the storing address; a step of judging whether or not an identification key is included in the inputted keys if the inputted keys represent the storing address; a step of displaying corresponding detailed item on a display unit if the identification key of the detailed item is detected in the inputted keys; a step of judging whether there is the storing address corresponding to the inputted keys if the identification key is not detected in the inputted keys; a step of trying to call connect to a representative number of the corresponding storing address if there is the storing address which is corresponded to the inputted keys; and a step of displaying an error message representing that there is not the storing address corresponding to the inputted keys on the display unit if there is not the storing address corresponding to the inputted keys.

Preferably, the step of call connecting includes a step of displaying the detailed items of the corresponding storing address if the identification key representing the detailed item on the display unit; a step of judging whether or not the user selects one of the displayed detailed items; a step of trying to call connect to the telephone number corresponding to the detailed item selected by the user; a step of judging whether there is corresponding telephone number by searching the detailed items if the detected identification key includes the detailed item key; and a step of an error message representing that there is not the storing address corresponding to the inputted keys on the display unit if there is not the storing address corresponding to the detailed item.

To further achieve at least the above objects in whole or in parts, there is provided a method for accessing a telephone number in a mobile communication terminal, including a step of storing key data inputted through a key input unit by a user of the mobile terminal; and a step of setting a storing address number of the key data and detailed items under the storing address.

In order to further achieve at least the above objects in whole or in parts, there is provided a method for accessing a telephone number in a mobile communication terminal including a step of storing a telephone number in a detailed item under a storing address by a user of a mobile terminal and a step of accessing to the telephone number stored in the detailed item through a hot key inputted by the user.

In order to further achieve at least the above objects in whole or in parts, there is provided a method for accessing a telephone number in a mobile communication terminal including a step of inputting key data through a key input unit; a step of setting a storing address and detailed item of the key data; a step of storing the key data in the detailed item of the corresponding storing address; a step of judging whether or not the key data inputted by the user is the storing address; a step of judging whether there is a detailed item in the storing address of the key data; and a step of displaying the detailed item on a display unit and calling the corresponding telephone number.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made to the preferred embodiments of the present invention, examples of which are illustrated in the accompanying drawings.

Figure 3:
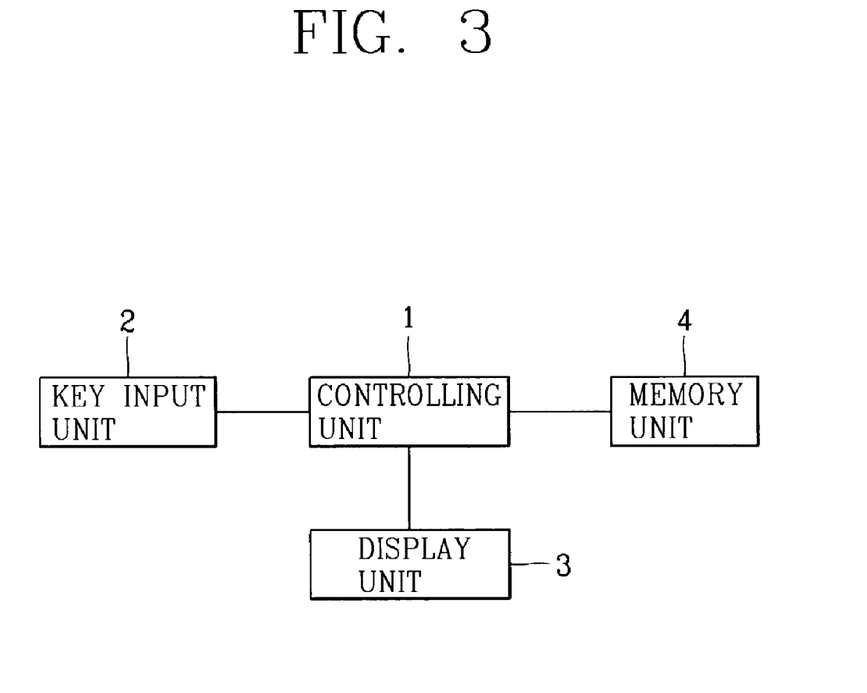
FIG. 3 is a block diagram showing a structure of a mobile communication terminal according to a preferred embodiment of the present invention.

Referring to FIG. 3, the mobile terminal according to a preferred embodiment of the present invention preferably includes a key input unit 2 through which various commands are inputted to the mobile terminal, a display unit 3 to display an operational status of the mobile terminal, and a memory unit 4 in which an operational algorithm of the mobile terminal or telephone numbers are stored. The mobile terminal also preferably includes a controlling unit 1 for outputting a controlling signal of the mobile terminal.

The key input unit 2 transmits key data, such as a hot key or a telephone number inputted by a user of the mobile terminal, to the controlling unit 1, and the display unit 3 displays a result of data processing in the controlling unit 1 or the telephone number accessed using the hot key.

In addition, the memory unit 4 includes a read only memory (ROM), which is a non-volatile memory including an operational algorithm of the mobile terminal, and a random access memory (RAM), which is a volatile memory for storing data. The RAM preferably includes a telephone number storing area to store telephone numbers inputted through the key input unit 2. The telephone number storing area preferably includes storing addresses that have prescribed detailed items. For example, each storing address may include detailed items set in an order of 1) home, 2) office, and 3) cellular phone.

The controlling unit 1 determines whether or not the key inputted by the user of the mobile terminal is a memory address, searches the telephone number by searching the detailed items of the memory address corresponding to the inputted key, and performs various operational processes.

The operational algorithm includes a step of storing key data inputted during an idle mode of the mobile terminal in the memory unit 4, displaying corresponding key data on the display unit 3, and determining whether or not the stored key data is a memory address and trying to connect a call to the corresponding telephone number using the memory address.

The memory address preferably defines a certain sign such as * or # on the terminal as an identification key representing the detailed item. The detailed item is then determined according to the inputted hot key in conjunction with the detailed item key or with the combination of certain keys such as ## or **.

Figure 4:
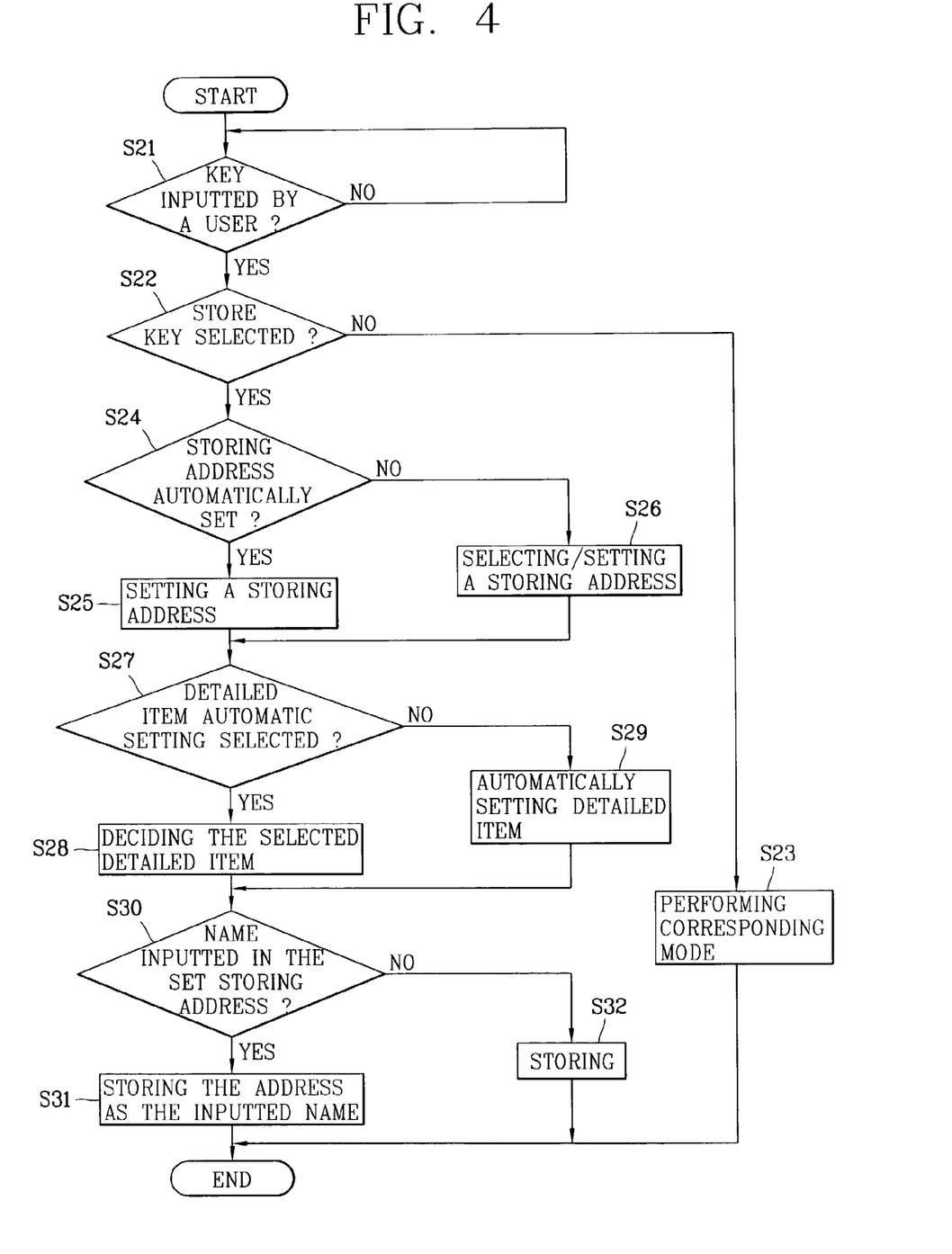
FIG. 4 is a flow chart showing an operation for storing a telephone number in a mobile communication terminal according to a preferred embodiment of the present invention.

FIG. 4 illustrates a method for storing a telephone number in the mobile terminal according to the preferred embodiment of the present invention.

As shown therein, the controlling unit 1 recognizes an input of the user through a key input unit in order to determine the key data transmitted from the key input unit by the selected key of the user in the idle mode (S21). The key data corresponding to the inputted key is stored in a buffer when the key data is transmitted from the key input unit 2. The controlling unit 1 then determines whether or not the inputted key will be stored in the memory (S22).

If storing is not selected, the mode corresponding to the key selected by the user is performed (S23). For example, when a send key is selected, a call connect is attempted. In addition, if the storing is selected, the user determines whether or not the inputted key will be stored automatically in the telephone storing area of the memory in order of storing address usage (S24).

When the automatic storing is selected, the memory location of the inputted key is set according to the order of usage (S25). If however, the automatic setting of the memory location is not selected, the memory location selected by the user is set as the storing address of the inputted key (S26).

Next, the mobile terminal determines where the key data will be stored among the detailed items of the memory location (S27). When the detailed item is selected, the selected item is determined to be the detailed item of the inputted key data (S28). When the detailed item is not selected, the inputted key data is stored in a detailed item which is set automatically (S29).

The mobile terminal next determines whether or not additional information relating to the key data that has been inputted into the decided detailed item is inputted in the selected storing address (S30). When such information is inputted into the storing address, the inputted key data and information is stored in the detailed item of the memory location and the process ends (S31). When the information is not inputted into the memory location, the mobile terminal stores that status and ends the process (S32).

Figure 5:
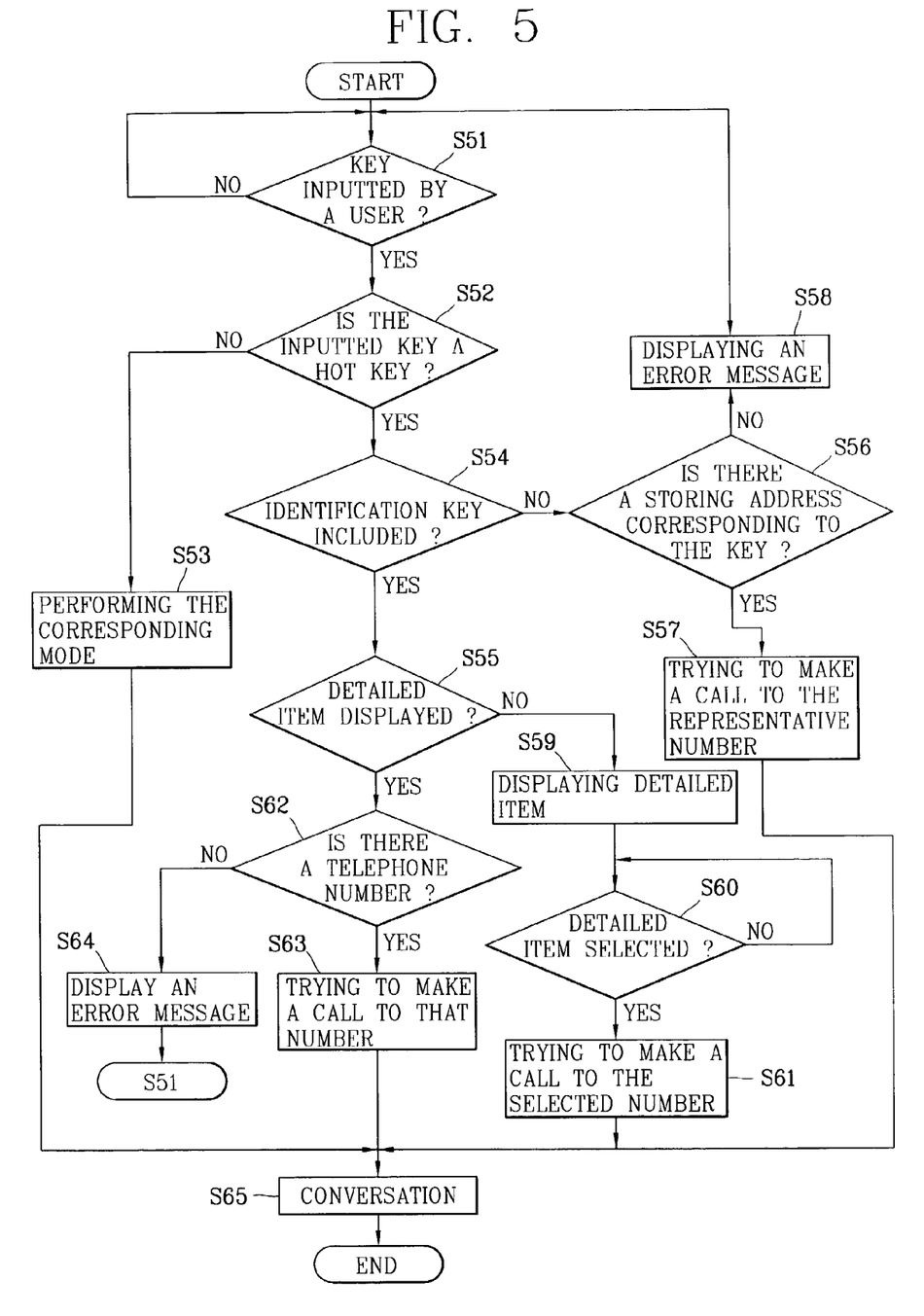
FIG. 5 is a flow chart showing a method for accessing to a telephone number in the mobile terminal according to a preferred embodiment of the present invention.

A method for accessing the telephone number stored in the mobile terminal using the hot key will be described in more detail with reference to FIG. 5.

The method for accessing the telephone number preferably includes determining by the controlling unit 1 whether or not the input key transmitted from the key input unit 2 by the key selection of the user is a hot key, determining whether or not the detailed item key is included in the hot key of the key data, and displaying the detailed item on the display unit 3 according to the detailed item key. A call is then preferably connected to the corresponding telephone number.

In determining the use of the hot key, when the user opens a flip or a folder in order to place a call in the idle mode, the controlling unit 1 preferably recognizes the key selection of the user by interpreting the key data transmitted from the key input unit 2 (S51). In addition, when key data is inputted, the mobile terminal determines whether or not the key data is the hot key (S52).

If the key data is not the hot key, the mobile terminal tries to connect a general phone call in accordance with the inputted key (S53). If the key data is the hot key, the mobile terminal determines whether or not the identification key of the detailed item (for example, *, #, **, ##) is included in the inputted keys (S54). When the identification key of the detailed item is included in the inputted keys, the mobile terminal determines whether or not the detailed item corresponding to the detected identification key is displayed on the display unit 3 (S55). Additionally, if the identification key is not included in the inputted key, the mobile terminal determines whether there is a memory location corresponding to the inputted key among the memory locations in the telephone storing area (S56).

If there is a memory location corresponding to the inputted keys, a call connection to the representative number in the memory location is attempted (S57). Conversely, if there is no memory location corresponding to the inputted key, the mobile terminal preferably displays an error message on the display unit 3 indicating that there is no memory location corresponding to the inputted key (S58). The process then returns to the step of recognizing the key inputting of the user (S51).

If there is the identification key representing the detailed item (for example, ** or ##), the detailed items of the memory location corresponding to the inputted key are preferably displayed on the display unit 3 (S59). The mobile terminal then determines whether or not the user selects a displayed detailed item (S60). A call connection to the telephone number corresponding to the detailed item selected by the user is attempted (S61). The processes are then ended after the phone call is made (S65).

If the identification key includes the key of detailed item, the mobile terminal determines whether there is a telephone number corresponding to the detailed item key after detecting the detailed item key (S62). If there is such a telephone number, a call connection to that telephone number is attempted (S63). If, however, there is no corresponding telephone number, the mobile terminal preferably displays an error message on the display unit 3 indicating that no telephone number of the detailed item (S64). The process then returns to recognizing the key input of the user (S51). After the call is connected and the conversation is made, the mobile terminal preferably ends the process (S65).

As described above, the method for accessing a telephone number in the mobile terminal according to the preferred embodiment of the present invention will be described in more detailed as follows.

Figure 6:
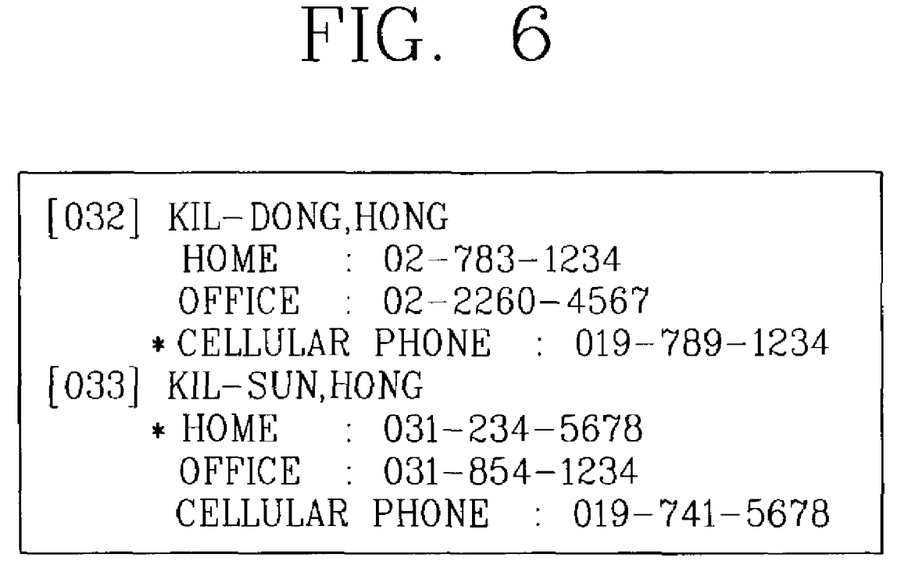
FIG. 6 is a drawing showing a telephone number stored according to a preferred embodiment of the present invention.

Referring to FIG. 6, if the user of the mobile terminal stores telephone number information of a certain person in the mobile terminal, the user preferably inputs the numbers using the key input unit 2 of the mobile terminal. Any input device could be used, however.

When the user selects a "store" key to store the inputted telephone number after the respective number in the telephone number, for example, 019-789-1234 is inputted, a message which requires setting a memory location to which the inputted key will be stored in the telephone number storing area of the memory unit 4 is displayed on the display unit 3.

At that time, the memory location having the priority order of usage among the available storing addresses in the telephone number memory area is automatically set and displayed in the message in accordance with the storing address automatic setting function. However, the user is alternatively able to select a discretionary storing address.

For example, if 032 is selected as the storing address, the user selects a detailed item "3) cellular phone" corresponding to the inputted key among the detailed items such as 1) home, 2) office, and 3) cellular phone, and inputs the name corresponding to the telephone number such as Kil-dong, Hong. Then, the address 032 is set as Kil-dong, Hong, and the inputted keys 019-789-1234 are set in the detailed item "3) cellular phone." Also, the user sets the detailed item "3) cellular phone" as the representative number of the address 032.

Through the above processes, the telephone numbers corresponding to the home, office, and cellular phone of Kil-dong, Hong are inputted in memory location 032.

The user accesses the stored telephone number in the detailed item using the hot key, that is, the storing address and the identification key of the detailed item. In the preferred embodiment of the present invention, the identification key of the detailed item is defined as *, and displaying of the detailed item on the display unit 3 is defined as **.

If the user remembers the address and the detailed item of the telephone number corresponding to the house number of Kil-dong, Hong, the user can call to the house of Kil-dong, Hong by inputting the hot key **32*1 corresponding to the house number of the Kil-dong, Hong. When the user inputs the respective key 3, 2**, *, 1, the mobile terminal detects the * which is the identification key of the detailed item in the inputted keys **32*1** to determine that the detailed item key is included. Any key or combination could be used to identify the detailed item.

After that, the mobile terminal discerns whether or not a telephone number is stored in the detailed memory location corresponding to the "1) house," which is represented by the detailed item key included behind the identification key. A call connection to the corresponding telephone number is then attempted if there is a stored telephone number.

As another embodiment, if the user wants to call to the office of Kil-dong, Hong, but does not know the detailed item number corresponding to the office number, the user inputs the memory location 32 and  for displaying the detailed items in the storing address 32. When 032* is inputted, the detailed items in the memory location of the hot key are displayed on the display unit 3** of the mobile terminal. The user can then select an item among those detailed items to place a call.

The method for accessing to the telephone number in the mobile terminal of the preferred embodiment has may advantages. For example, when the user wants to call a telephone number which is not a representative number, the user is able to call to the telephone number of the detailed item using the hot key by inputting the key representing the detailed item together with the hot key and the identification key. In addition, if the user does not remember the detailed item, the user is able to call after identifying the detailed item by displaying the detailed items on the display unit. The user is thus able to call more conveniently. It should be understood that any key or key sequence could be used to define, identify, or access the detailed item for any given storage location.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for accessing a phone number stored in a mobile communication terminal including a memory for storing an operational algorithm and data, the memory having a plurality of memory locations, each memory location having at least one detailed item stored therein, and each detailed item including a phone number, the method comprising:
   receiving an alphanumeric key input that corresponds to a memory location of a memory;
   receiving an identification key input that identifies detailed items stored in the memory location; and
   receiving a numeric key input that corresponds to one detailed item and that initiates a call connection to a phone number that corresponds to the detailed item.

2. The method of claim 1, further comprising displaying all detailed items stored in the memory location for selection by a user if said identification key input is received.

3. The method of claim 1, wherein the alphanumeric, identification, and numeric key inputs are received without prompting a user.

4. The method of claim 1, wherein the identification key input is a non-numeric key input.

5. The method of claim 1, wherein the call connection is performed without receiving additional key inputs from the user.

6. A method of accessing stored contact numbers in a mobile terminal having a keypad and a memory, the method comprising:
   receiving a sequence of consecutive key inputs from a user via a keypad to access one or more contact numbers stored in a memory; and
   automatically attempting a call connection to the accessed one or more contact numbers, or displaying multiple contact numbers stored in the memory to allow user selection thereof, based on a last key input of the received sequence of consecutive key inputs.

7. The method of claim 6, further comprising automatically attempting a call connection to a user selected contact number selected from the displayed multiple contact numbers.

8. The method of claim 6, wherein the sequence of consecutive key inputs are received without prompting the user, and wherein the sequence of consecutive key inputs includes:
   one or more numeric key inputs indicating a memory location of the memory;
   an identification key input indicating sub-locations within the memory location; and
   a subsequent key input to access one sub-location of the memory location, or to access all sub-locations of the memory location.

9. The method of claim 8, wherein the subsequent key input is a detailed item key input to access one of the sub-locations.

10. The method of claim 8, wherein the subsequent key input is a displaying key input to access all contact numbers stored in the sub-locations.

11. A mobile communication terminal apparatus including a memory for storing an operational algorithm and data including a plurality of phone numbers, the memory having a plurality of memory locations, each memory location having at least one detailed item stored therein, and each detailed item including a phone number, the apparatus comprising:
   an input unit configured to allow a user to input key data;

a memory comprising multiple memory locations each configured to store detailed items therein; and a controller operably coupled to the input unit and the memory, wherein the input unit is configured to receive an alphanumeric key input that corresponds to a memory location of the memory, to receive an identification key input that identifies detailed items stored in the memory location, and to receive a numeric key input that corresponds to one detailed item, and wherein the controller is configured to initiate a call connection to a phone number that corresponds to the one detailed item when the numeric key input that corresponds to the one detailed item is received.

12. The apparatus of claim 11, wherein the controller is configured to display all detailed items stored in the memory location on a display for selection by the user if said identification key input is received.

13. The apparatus of claim 11, wherein the key inputs are received without prompting the user.

14. The apparatus of claim 11, wherein the identification key is a non-numeric key.

15. The apparatus of claim 11, wherein the call connection is performed without receiving additional key inputs from the user.

16. A mobile terminal, comprising:
a keypad configured to receive key inputs from a user;
a display configured to display information to the user;
a memory configured to store contact numbers and information therein;
a controller operably coupled to the keypad, the display, and the memory and configured to receive a sequence of consecutive key inputs from the user via the keypad to access one or more contact numbers stored in the memory, and to automatically attempt a call connection to the accessed one or more contact numbers, or to display multiple contact numbers stored in the memory to allow user selection thereof, based on a last key input of the received sequence of consecutive key inputs.

17. The terminal of claim 16, wherein the controller is further configured to automatically attempt a call connection to the user selected contact number of the displayed multiple contact numbers.

18. The terminal of claim 16, wherein the sequence of consecutive key inputs are received without prompting the user, and wherein the sequence of consecutive key inputs includes:
one or more numeric key inputs indicating a memory location of the memory;
an identification key input indicating sub-locations within the memory location; and
a subsequent key input to access one sub-location of the memory location or to access all sub-locations of the memory location.

19. The terminal of claim 16, wherein the subsequent key input is a detailed item key input to access one of the sub-locations.

20. The terminal of claim 16, wherein the subsequent key input is a displaying key input to access all contact numbers stored in the sub-locations.

* * * * *